3,817,934
SULFODICARBOXYLIC ACID CAPROLACTAM REACTION PRODUCT MODIFIED POLYESTERS
Maneung Hahn, Bath, and Yuzi Okuzumi, Akron, Ohio, assignors to The Goodyear Tire & Rubber Company, Akron, Ohio
No Drawing. Filed Feb. 26, 1973, Ser. No. 335,961
Int. Cl. C08g 20/30
U.S. Cl. 260—75 N                    6 Claims

ABSTRACT OF THE DISCLOSURE

An improved method for preparing cationic dyeable high molecular weight linear polyesters and copolyesters which comprises adding to a polyester forming process a modifying agent of the formula

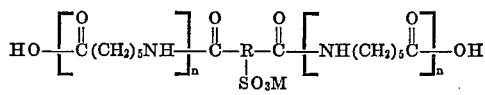

where R is a divalent organic radical selected from the group consisting of (a) divalent aliphatic radicals, (b) substituted and unsubstituted aromatic radicals where said substitution is selected from alkyl radicals and (c) divalent phenylindane radicals, $n$ is an integer ranging from 2 to 20 and M is an alkali metal.

---

This invention relates to an improvement in the preparation of high molecular weight linear polyesters and copolyesters which results in said polyesters and copolyesters possessing improved dyeability and particularly improved cationic dyeability. Still further, this invention relates to new high molecular weight linear polyesters and copolyesters possessing improved dyeability.

It is well known that high molecular weight linear polyesters and copolyesters possessing fiber and film forming ability can be prepared by initially reacting either a dicarboxylic acid or lower alkyl ester (i.e., $C_1$–$C_4$) thereof with a glycol to form the corresponding diglycol esters of the dicarboxylic acid or low molecular weight polyester prepolymer. Subsequently the diglycol ester or low molecular weight polyester is subjected to polycondensation conditions to yield the desired high molecular weight polyester or copolyester. The polyesters and copolyesters prepared in these various manners have found wide commercial acceptance because of their excellent inherent properties of, inter alia, high tensile strength, low water absorption, resistance to many chemicals and resistance to thermal, hydrolytic and ultraviolet light degradation.

However, it is also well known that these same polyesters and copolyesters possess an inherent resistance to dyeing and particularly cationic dyeing which can be overcome in a single operation which comprises adding to any well known polyester or copolyester forming process, consisting of the steps of (1) reacting at least one aromatic dicarboxylic acid or lower alkyl ester thereof (i.e., a $C_1$–$C_4$ alkyl ester) with at least one glycol of the formula $HO(CH_2)_nOH$ where $n$ is an integer ranging from 2 to 10 and (2) polycondensing the reaction product of said step (1), from 0.5 to 5.0 mol percent, based on the total number of mols of polyester or copolyester formed, of a modifying agent of the formula

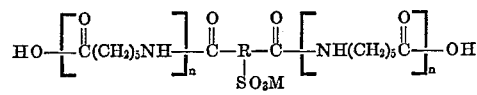

wherein R is a divalent organic radical selected from the group consisting of (a) divalent aliphatic radicals, (b) substituted and unsubstituted divalent aromatic radicals wherein said substitution is selected from alkyl radicals and (c) divalent phenylindane radicals and where $n$ is an integer ranging from about 2 to about 20 and preferably from about 2 to about 8 and M is a metal selected from the group consisting of alkali metals.

The addition of the above described modifying agents to a polyester forming process has been found to render high molecular weight linear polyesters and copolyesters readily dyeable, particularly with cationic (basic) dyes, without the need to employ the usual "dye openers" or "dye carriers." By the term "high molecular weight" is meant polyesters and copolyesters having intrinsic viscosities of at least 0.4 and preferably at least 0.5 or higher as determined on a 0.3 gram sample dissolved in 100 milliliters of a 60/40 phenol/tetrachloroethane solvent at 30° C. Also, as employed hereinafter the term "polyester" is understood to include both homopolyesters and copolyesters.

The modifying agents defined by the above formula are prepared by first mixing together epsilon-caprolactam, a sulfonated dicarboxylic acid alkali metal salt and from about 1.0 percent by weight to about 10.0 percent by weight of water, based on the total weight of caprolactam and sulfonated dicarboxylic acid salt employed. This mixture is then heated under an inert gas atmosphere (e.g. nitrogen) for a sufficient length of time to assure complete reaction. Generally the epsilon-caprolactam and the sulfonated dicarboxylic acid salt can be reacted together in a molar ratio ranging from about 2:1 to about 20:1. Preferably a molar ratio of 10:1 is employed. The product, a sulfonated polyamide corresponding to the above formula, is purified by washing with water and then drying under heat and vacuum.

Representative examples of sulfonated dicarboxylic acid salts useful in the preparation of the sulfonated polyamides include those derived from aliphatic dicarboxylic acids such as adipic acid, suberic acid, azelaic acid and sebacic acid; aromatic dicarboxylic acids such as terephthalic acid, isophthalic acid, the various isomers of naphthalene dicarboxylic acid and the various isomers of biphenyl dicarboxylic acid; and phenylindane dicarboxylic acid. The preferred sulfonated dicarboxylic acid salts are those derived from isophthalic acid, phenylindane dicarboxylic acid, the 2,6 and 2,7-naphthalene dicarboxylic acids, and the metal sodium. Representative examples include sodium 5-sulfoisophthalic acid; sodium 4-sulfo-2,6-naphthalene dicarboxylic acid; and 3-(sodium 6-sulfo-4-carboxy)phenyl-1,1,3-trimethyl-5-indane carboxylic acid.

The amount of modifying agent necessary to produce cationic dyeable polyesters will depend upon such factors as the depth of shade of the dyed goods desired and physical properties desired. In general, however, satisfactory results have been obtained when from about 0.5 to about 4.0 mol percent of the modifying agents of this invention are employed based on the calculated amount of polyester or copolyester resin produced.

The modifying agents described above may be added to either a direct esterification-polycondensation process or a transesterification (ester interchange)—polycondensation process to produce the cationic dyeable polyesters of this invention. The preparation of highly polymeric linear aromatic polyesters via the direct esterification reaction is generally carried out with a molar ratio of glycol to aromatic dicarboxylic acid of from about 1.01/1 to about 2/1, but preferably from about 1.05/1 to about 1.2/1 at temperatures ranging from about 200° C. to 300° C. in the absence of an oxygen containing atmosphere at atmospheric or superatmospheric pressures to form a low molecular weight polyester prepolymer having a degree of polymerization (D.P.) ranging from about 2 to about 20. The reaction may be carried out in a nitrogen atmosphere. Furthermore, the esterification reaction can be carried out in the presence of a solvent, said solvent consisting of a low molecular weight polyester such as described immediately above.

Similarly, the preparation of high molecular weight linear polyesters via the transesterification or ester interchange reaction is generally carried out with a molar ratio of glycol to lower alkyl (i.e., $C_1$–$C_4$) ester of the dicarboxylic acid of from about 2/1 to about 2.5/1 and preferably from about 2.1/1 to 2.3/1. Further, the transesterification reaction is generally run at temperatures ranging from about 170° C. to about 260° C. and preferably from about 200° C. to about 240° C. at pressures ranging from atmospheric to superatmospheric. Again, here, as in the direct esterification process described above, the reaction is run in the absence of an oxygen containing atmosphere and in an inert gas atmosphere such as nitrogen. In general a transesterification catalyst such as manganese acetate is employed to effectuate the reaction. During the course of the transesterification reaction by-product alcohol is removed continuously by distillation until such time that all or nearly all of the by-product alcohol is removed. The polyester prepolymer prepared in this manner is a mixture of the glycol diester of the dicarboxylic acid and low molecular weight polyester as described above.

The polyester prepolymer or mixture of glycol diester and low molecular weight polyester is then subjected to polycondensation or polymerization conditions. In this polycondensation or polymerization stage the polyester prepolymer is heated at temperatures ranging from about 240° C. to about 300° C. at pressures of less than one millimeter of mercury pressure. The polycondensation step is carried out employing such catalysts as antimony trioxide. The reaction is allowed to proceed with continuous removal of by-product glycol until the reaction is complete as determined by the amount of by-product removed.

Various other materials in addition to catalysts may be added to these polyester producing processes. Such various other materials include thermal, hydrolytic and ultraviolet light stabilizers. In addition, pigments, delusterants and other similar additives may be present.

The modifying agents of this invention are added either at or near the end of the direct esterification or transesterification steps and prior to the polycondensation step. In other words, the modifying agents are added to the polyester prepolymer. In general, the modifying agents are added in the form of a solid. Once the modifying agent has been added to the polyester prepolymer, the prepolymer is then polymerized in the manner described hereinabove.

The above described improvement is applicable not only to the preparation of homopolyesters of improved dyeability from a single aromatic dicarboxylic acid, such as terephthalic acid, or lower alkyl ester thereof, such as dimethyl terephthalate and a single glycol such as ethylene glycol, but also to the preparation of copolyesters of improved dyeability. The invention is illustrated below particularly with respect to the preparation of cationically dyeable fiber and film forming polyethylene terephthalate. The process comprising the present invention is also useful in the preparation of various other cationically dyeable polyesters prepared from various other dicarboxylic acids and glycols. Representative examples of other dicarboxylic acids include isophthalic acid; orthophthalic acid; phenylindane dicarboxylic acid; 2,5- and 2,6-naphthalene dicarboxylic acid and the like; the cycloaliphatic dicarboxylic acids such as tetrahydroterephthalic acid and the like and aliphatic dicarboxylic acids such as glutaric, adipic, azelaic, sebacic, dodecanedicarboxylic and dimer acids and the like. Mixtures of these acids may also be employed as well as the lower alkyl esters (i.e., $C_1$–$C_4$ alkyl esters) of these acids. Representative of other glycols include the polymethylene glycols having from 2 to 10 methylene groups such as propylene glycol, tetramethylene glycol, neopentylene glycol, hexamethylene glycol and decamethylene glycol; the cyclohexane diols, cyclohexane dimethanol, di-$\beta$-hydroxyethoxy benzene and 2,2-bis[4($\beta$-hydroxyethoxy) phenyl] propane and similar glycols. Mixtures of these various glycols can also be employed.

The physical properties of the modified polyesters are sufficiently close to those of their related nonmodified polyesters to make them acceptable for the same uses as their nonmodified counterparts. Fibers and films produced from these modified polyesters differ, however, in that they have a particular receptivity toward cationic or basic dyes. By a "cationic or basic dye" is meant a color cationic organic substance such as those containing sulfonium, oxonium or quaternary ammonium functional groups. Generally these cationic dyes are employed in a hot aqueous solution and the techniques for applying these dyes are well known. Representative examples of cationic dyes which can be employed include Basic Red 18, Basic Yellow 13, Basic Blue 77, Basic Red 13, Basic Blue 87, Basic Orange 21, Basic Yellow 53, Basic Red 14, Basic Blue 4, Basic Orange 2 and other similar cationic dyes which are listed in *Colour Index*, 3rd ed. (1971) and published by the Society of Dyers and Colourists (Great Britain).

In order to more fully illustrate the present invention the following examples are presented.

EXAMPLE 1

To a 2000 milliliter three necked flask equipped with mechanical stirrer, nitrogen inlet, thermometer and distilling arm were added 1000 grams of epsilon-caprolactam, 237 grams of sodium-5-sulfoisophthalic acid (molar ratio 10:1) and 100 milliliters of distilled water. The flask was heated slowly until the mixture became a homogeneous solution. The temperature was then slowly raised to 250° C. and kept at that temperature for three hours. The contents were then slowly poured into a stainless steel beaker containing 3000 milliliters of distilled water. The precipitated product was ground with a blender and washed with distilled water and filtered. The product was then dried in a vacuum oven at 60° C. for 12 hours. The product had a white color.

EXAMPLE 2

36.9 grams (0.19 mol) of dimethyl terephthalate, 26 grams (0.42 mol) of ethylene glycol, 0.013 gram of zinc acetate and 0.012 gram of antimony trioxide were charged into a polymerization glass reactor equipped with mechanical stirrer, nitrogen inlet and distilling arm. The reactor was heated to 200° C. for transesterification. The transesterification reaction was carried out for two hours. Ten grams of the reaction product of Example 1 were then added to the reactor and the temperature raised to 220° C. The polycondensation reaction was carried out at 265° C. and 0.4 millimeter of mercury pressure. The product obtained was a fiber forming crystalline homogeneous polymer. The drawn fiber was dyeable in deep shade with Basic Blue 4.

EXAMPLE 3

Five separate batches of poly(ethylene terephthalate) were prepared in the following manner. Six hundred grams of dimethyl terephthalate, 390 milliliters of ethylene glycol and 0.21 gram of manganese acetate were added into a reactor equipped with a heating device, mechanical stirrer, nitrogen inlet and distilling arm. The above mixture was heated at 200° C. for three hours to effectuate the transesterification reaction. After the calculated amount of methanol was distilled off there was then added 0.13 gram of antimony trioxide, 75.0 grams of the reaction product of Example 1 and 0.22 milliliter of triphenyl phosphite to the transesterification product.

This mixture was then polycondensed at 275° C. and one millimeter of mercury pressure for two hours to yield crystalline polymer. The five polymers were then ground, blended and extruded into fibers having a denier of 149, a tensile strength of 324, a tenacity of 2.17 grams/denier, an elongation of 21.9 percent and shrink of 11.9 percent. These fibers were then used to prepare knitted socks which were then dyed to deep shades employing Basic Orange 2, Basic Blue 4, Basic Orange 21 and Basic Red 13 without carrier.

While certain representative embodiments and details have been shown for the purpose of illustrating the invention it will be apparent to those skilled in this art that various changes and modifications may be made therein without departing from the spirit or scope of the invention.

What we claim is:

1. A cationic dyeable high molecular weight linear polyester or copolyester consisting essentially of (1) the esterification or transesterification reaction product of at least one dicarboxylic acid or lower alkyl ester thereof with at least one glycol of the formula $HO(CH_2)_nOH$ where $n$ is an integer ranging from 2 to 10 copolymerized with (2) from 0.4 to 5.0 mol percent, based on the mols of polyester or copolyester repeating units, of a modifying agent of the formula

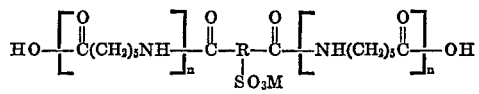

wherein R is a divalent organic radical selected from the group consisting of (a) divalent aliphatic radicals, (b) substituted and unsubstituted divalent aromatic radicals wherein said substitution is selected from alkyl radicals and (c) divalent phenylindane radicals, M is a metal selected from the group consisting of alkali metals and $n$ is an integer ranging from 2 to 20.

2. A cationic dyeable high molecular weight linear polyester according to Claim 1 which consists essentially of (1) the esterification or transesterification reaction product of terephthalic acid or dimethyl terephthalate and ethylene glycol copolymerized with (2) from 0.4 to 5.0 mol percent, based on the number of mols of polyester repeating units, of a modifying agent corresponding to the formula

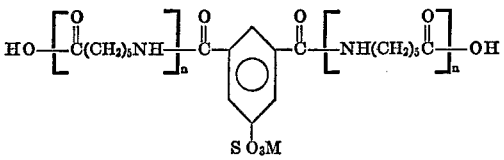

where M is sodium and $n$ is an integer ranging from 2 to 8.

3. A cationic dyeable polyester or copolyester according to Claim 1 in the form of a cationically dyed fiber.

4. A cationic dyeable polyester or copolyester according to Claim 1 in the form of a cationically dyed film.

5. A cationic dyeable polyester according to Claim 2 in the form of a cationically dyed fiber.

6. A cationic dyeable polyester according to Claim 2 in the form of a cationically dyed film.

References Cited

UNITED STATES PATENTS

| | | |
|---|---|---|
| 3,313,778 | 4/1967 | Sakurai et al. |
| 3,471,446 | 10/1969 | Delves et al. |
| 3,661,504 | 5/1972 | Stackman et al. |

FOREIGN PATENTS

| | | |
|---|---|---|
| 29,992 | 12/1969 | Japan. |
| 2,038,252 | 2/1971 | Germany. |

OTHER REFERENCES

Mandrosora et al., *Khim Volokna* 1968 (5), 14–15.

MELVIN GOLDSTEIN, Primary Examiner

U.S. Cl. X.R.

8—Dig. 4